Patented July 7, 1942

2,289,001

UNITED STATES PATENT OFFICE 2,289,001

PROCESS OF PREPARING PHENOLS

Wilhelm Fitzky, Frankfort-on-the-Main-Unterliederbach, Germany

No Drawing. Application June 27, 1940, Serial No. 342,685. In Germany July 14, 1939

8 Claims. (Cl. 260—621)

The present invention relates to a process of preparing phenols.

In the co-pending U. S. application Serial No. 278,074 filed June 8, 1939, there is described a process of preparing phenols by heating an aromatic amine of the group consisting of aniline and its homologues at temperatures of at least 200° C. under superatmospheric pressure in the presence of water and of an acid catalyst known to promote hydration. These catalysts promoting hydration are such substances as are known to promote the addition of water to a double linkage.

Now I have found that the hydrolysis of aniline and its homologues with aqueous solutions of acid hydrating agents occurs at temperatures higher than 250° C., for instance at a temperature of about 350° C. with separation of free ammonia. This operation is obviously due to the fact that at the temperatures named the compounds described in the afore-named application and consisting of the acid hydrating agent and ammonia (for instance ammonium phosphate) are no longer completely stable. By removing the ammonia at a high temperature it is possible to influence the total reaction in the sense of the equation

$$C_6H_5NH_2 + H_2O = C_6H_5OH + NH_3$$

with an increased formation of phenol. The hydrating agent plays in this connection more or less the part of a perfect catalyst.

In conformity therewith I have furthermore found that there may be used not only the quantities given in the afore-named application, but that there may be operated with less than the quantity calculated of the hydrating agent, i. e. with a quantity smaller than that required for binding the ammonia formed, for instance with half the quantity, it being not absolutely necessary to remove the ammonia. By the application of the hydrating agent in a quantity smaller than that hitherto used and in the form of a genuine catalyst, the regeneration becomes entirely or partly superfluous. In view of this fact and owing to the saving of auxiliary agents an essential industrial progress is attained.

It is particularly advantageous to operate at temperatures between about 350° C. and about 370° C.; the process may, however, also be carried through at a temperature of about 400° C.

The same catalysts as those named in the afore-mentioned application as well as the same quantities of water may be used. The superatmospheric pressures used are likewise the same as those of the afore-named application.

The moment at which the reaction is as complete as possible may readily be ascertained in each case. For this purpose a test portion of the reaction mixture may be examined in order to estimate whether the main quantity of the aniline has been consumed. This test may be performed by diazotization.

Besides aniline the homologues thereof, such as ortho-, meta- and para-toluidine as well as the xylidines may be transformed in the like manner into the corresponding phenols.

The following examples serve to illustrate the invention but they are not intended to limit it thereto, the parts being by weight:

1. 14.2 parts of aniline, 22.2 parts of phosphoric acid of the specific gravity of 1.5 and 52 parts of water are subjected in a silver-plated tube for 3 hours at a temperature of 350° C. to rapid mechanical oscillations. By a partial relief of pressure about 0.3 part of ammonia is blown off. Shaking of the tube is then continued for 3 hours at 350° C. By a suitable further treatment phenol is obtained in a very good yield.

2. 9.3 parts of aniline, 6 parts of phosphoric acid and 66 parts of water are subjected as described in Example 1 in a silver-plated tube for 6 hours at a temperature of 370° C. to rapid mechanical oscillations. By an extraction of the contents of the tube the phenol formed is obtained.

Even the acid ammonium phosphate which, as is known, may reversibly take up ammonia, causes hydrolysis.

3. 56 parts of aniline, 25 parts of primary ammonium phosphate and 420 parts of water are heated for 3 hours in an autoclave at a temperature between 350° C. and 360° C. The mixture is then cooled to about 200° C. and most of the ammonia formed is subjected to a fractional distillation through a short column. Heating is then continued for further 3 hours at 350° C.–360° C. and after the entire mixture has been cooled it is extracted with an organic solvent. By suitable separating methods (for instance separation of the phenol in the form of sodium phenolate) phenol is obtained, after the distillation of the organic solvent, in a yield of 55 per cent of the theoretical yield. The rest is unaltered aniline and diphenyl-amine. By the distillation of the ammonia from the aqueous portion at temperatures higher than 200° C. the original monoammonium-phosphate solution may be recovered.

Zinc chloride has the same effect, even when adding certain quantities of ammonia.

4. 56 parts of aniline are introduced into a solution of 27 parts of zinc chloride in 420 parts of water and 15 parts by volume of ammonia of 25 per cent strength are added. The mixture is then heated for 6 hours at temperatures of 350° C.–360° C. The cooled contents of the autoclave are extracted with ether and the phenol is isolated from the extract. The phenol is obtained in a yield of 50 per cent of the theoretical yield. Part of the ammonia may be blown off from the aqueous solution or the suspension at a raised temperature and the hydrolysing action of the liquid may be recovered.

I claim:

1. The process which comprises heating an aromatic amine of the group consisting of aniline and its homologues at temperatures higher than 250° C. under superatmospheric pressure in the presence of water and of an acid catalyst known to promote hydration and removing the ammonia formed during the process.

2. The process which comprises heating an aromatic amine of the group consisting of aniline and its homologues at temperatures between about 350° C. and about 370° C. under superatmospheric pressure in the presence of water and of an acid catalyst known to promote hydration and removing the ammonia formed during the process.

3. The process which comprises heating an aromatic amine of the group consisting of aniline and its homologues at temperatures higher than 250° C. under superatmospheric pressure in the presence of water and an amount of a compound showing a strongly acid reaction in an aqueous medium which is less than equimolecular to the amount of aromatic amine treated and removing the ammonia formed during the process.

4. The process which comprises heating 1 mol of an aromatic amine of the group consisting of aniline and its homologues at temperatures higher than 250° C. under superatmospheric pressure in the presence of at least 1 mol of water and of less than 1 mol of an acid catalyst known to promote hydration and removing the ammonia formed during the process.

5. The process which comprises heating an aromatic amine of the group consisting of aniline and it homologues at temperatures higher than 250° C. under superatmospheric pressure in the presence of water and of phosphoric acid and removing the ammonia formed during the process.

6. The process which comprises heating an aromatic amine of the group consisting of aniline and its homologues at temperatures higher than 250° C. under superatmospheric pressure in the presence of water and primary ammonium phosphate and removing the ammonia formed during the process.

7. The process which comprises heating 1 mol of an aromatic amine of the group consisting of aniline and its homologues at temperatures higher than 250° C. under superatmospheric pressure in the presence of at least 1 mol of water and less than 1 mol of phosphoric acid and removing the ammonia formed during the process.

8. The process which comprises heating 1 mol of an aromatic amine of the group consisting of aniline and its homologues at temperatures higher than 250° C. under superatmospheric pressure in the presence of at least 1 mol of water and less than 1 mol of primary ammonium phosphate and removing the ammonia formed during the process.

WILHELM FITZKY.